United States Patent
Tang et al.

(10) Patent No.: US 8,307,925 B2
(45) Date of Patent: Nov. 13, 2012

(54) HYBRID POWER DRIVING SYSTEM AND THE DRIVING METHOD

(75) Inventors: Xiaohua Tang, Shenzhen (CN); Chuanfu Wang, Shenzhen (CN); Hongbin Luo, Shenzhen (CN); Ruzhong Luo, Shenzhen (CN); Yi Ren, Shenzhen (CN); Xuguang Zhou, Shenzhen (CN); Guangquan Chen, Shenzhen (CN); Gexin Zheng, Shenzhen (CN); Ruru Niu, Shanghai (CN); Zhouping Tang, Shenzhen (CN); Yunhao Liao, Shenzhen (CN); Liang Liu, Shenzhen (CN); Nan Liu, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 313 days.

(21) Appl. No.: 12/664,027

(22) PCT Filed: May 28, 2008

(86) PCT No.: PCT/CN2008/071113
§ 371 (c)(1),
(2), (4) Date: Feb. 10, 2010

(87) PCT Pub. No.: WO2009/003380
PCT Pub. Date: Jan. 8, 2009

(65) Prior Publication Data
US 2010/0184559 A1    Jul. 22, 2010

(30) Foreign Application Priority Data

Jun. 29, 2007  (CN) .......................... 2007 1 0123217
Aug. 21, 2007  (CN) .......................... 2007 1 0143342
Oct. 31, 2007  (CN) .......................... 2007 1 0182078
Nov. 26, 2007  (CN) .......................... 2007 1 0187555

(51) Int. Cl.
*B60W 20/00*    (2006.01)
*F16D 11/06*    (2006.01)

(52) U.S. Cl. ................. 180/65.275; 192/43.1
(58) Field of Classification Search ............... 192/43.1, 192/45.1, 44, 46, 47; 477/5
See application file for complete search history.

(56) References Cited

U.S. PATENT DOCUMENTS 2,910,159 A * 10/1959 Nielsen ..................... 192/45.1
(Continued)

FOREIGN PATENT DOCUMENTS

CN            1355747            6/2002
(Continued)

OTHER PUBLICATIONS

International Search Report dated Aug. 12, 2008 issued in related PCT Application No. PCT/CN2008/071113 (International Publication No. WO 2009/003380).

*Primary Examiner* — Dirk Wright
(74) *Attorney, Agent, or Firm* — Brinks Hofer Gilson & Lione

(57) ABSTRACT

The present invention provides a hybrid power driving system comprising: a first subsystem designed to input/output power; a second subsystem designed to input/output power; a driving shaft designed to receive power from the first subsystem and/or the second subsystem or output power to the first subsystem and/or the second subsystem; and a tri-stated overrunning clutch designed to connect the first subsystem and the second subsystem, wherein the tri-stated overrunning clutch may be in an overrun state, an engaged state, or a disengaged state. The first subsystem and the second subsystem can comprise an engine, a motor, and a clutch, etc., respectively. In such a hybrid power driving system, when the tri-stated overrunning clutch is in the engaged state, the first subsystem and the second subsystem are coupled to each other and work together. When the tri-stated overrunning clutch is in the disengaged state, the first subsystem and the second subsystem can work separately without any interference to each other. Therefore, the structure is simple and the control is convenient.

22 Claims, 15 Drawing Sheets

U.S. PATENT DOCUMENTS

| | | | | |
|---|---|---|---|---|
| 3,164,234 A | * | 1/1965 | Tamarin | 192/40 |
| 3,363,733 A | * | 1/1968 | Titt | 192/45.1 |
| RE26,558 E | * | 3/1969 | Candela | 192/48.3 |
| 3,486,596 A | * | 12/1969 | Karl et al. | 192/45.1 |
| 3,534,836 A | * | 10/1970 | Dane | 192/43.1 |
| 3,599,767 A | * | 8/1971 | Sederquist | 192/43.1 |
| 3,907,083 A | * | 9/1975 | Nieder | 192/35 |
| 4,911,273 A | * | 3/1990 | Kinoshita et al. | 192/41 A |
| 5,025,902 A | * | 6/1991 | Imai et al. | 192/43 |
| 5,343,992 A | * | 9/1994 | Stark et al. | 192/45.1 |
| 5,732,807 A | * | 3/1998 | Itoh et al. | 192/38 |
| 5,799,749 A | * | 9/1998 | Yamamoto et al. | 180/247 |
| 5,993,351 A | | 11/1999 | Deguchi et al. | |
| 6,705,416 B1 | | 3/2004 | Glonner et al. | |
| 6,863,164 B2 | * | 3/2005 | Yamamoto | 192/41 A |
| 7,258,214 B2 | * | 8/2007 | Pawley et al. | 192/43.1 |
| 7,415,905 B2 | * | 8/2008 | Maguire et al. | 74/339 |
| 7,766,790 B2 | * | 8/2010 | Stevenson et al. | 477/8 |
| 7,942,781 B2 | * | 5/2011 | Kimes | 477/5 |
| 7,992,695 B2 | * | 8/2011 | Wittkopp et al. | 192/47 |
| 8,042,669 B2 | * | 10/2011 | Samie et al. | 192/43.1 |
| 8,079,453 B2 | * | 12/2011 | Kimes | 192/43.1 |
| 8,083,042 B2 | * | 12/2011 | Samie et al. | 192/43.1 |
| 2008/0099292 A1 | * | 5/2008 | Lee | 192/43 |
| 2009/0194381 A1 | * | 8/2009 | Samie et al. | 192/43.2 |

FOREIGN PATENT DOCUMENTS

| | | |
|---|---|---|
| JP | 1994280897 | 10/1994 |

* cited by examiner

HYBRID POWER DRIVING SYSTEM AND THE DRIVING METHOD

CROSS-REFERENCE TO RELATED APPLICATIONS

This application is a national phase application of PCT Application No. PCT/CN2008/071113, filed May 28, 2008, which claims priority from the following Chinese Patent Application Nos. 1) 2007-10123217.1, filed Jun. 29, 2007; 2) 2007-10143342.9, filed Aug. 21, 2007; 3) 2007-10182078.X, filed Oct. 31, 2007; and 4) 2007-10187555.1, filed Nov. 26, 2007, the contents all of which are incorporated herein by reference in their entirety.

TECHNICAL FIELD

The present invention relates to a hybrid power driving system and a driving method for the hybrid power driving system. Specifically, the present invention relates to a hybrid power driving system with a tri-state overrunning clutch and a driving method for the hybrid power driving system, wherein the tri-state overrunning clutch may be in an overrun state, an engaged state or a disengaged state.

BACKGROUND

A hybrid power driving system employs two different power sources together, and mainly has three structures (i.e., serial connection, parallel connection, and hybrid connection) depending on the type of connection. Since the functions of the driving systems in serial or parallel connection are too simple, driving systems in hybrid connection are usually used in the prior art.

In actual applications, driving systems in hybrid connection are mainly in two types: one type employs a planetary gear unit to realize the power distribution among the power units, while the other type employs a clutch to realize the power distribution among the power units. In the former type, both the structure and the control scheme of the driving system are quite complex. In the latter type, the control is relatively complex due to the limitation in function of the clutch.

In view of the above problems, the patent applicant improved on the conventional one-way overrunning clutch that only has an overrun state and an engaged state, and thereby invented a novel tri-state overrunning clutch which not only has the overrun state and the engaged state as the conventional overrunning clutch, but also has a disengaged state.

When the tri-state overrunning clutch described above is applied in a hybrid power driving system, the structure of the hybrid power driving system can be simplified, and the control will be easier.

SUMMARY OF THE INVENTION

One object of the present invention is to provide a hybrid power driving system which employs a tri-state overrunning clutch that can be controlled in an overrun state, an engaged state or a disengaged state, and thereby simplifies the structure of the hybrid power driving system and makes the control more convenient.

Another object of the present invention is to provide a driving method for the hybrid power driving system, which employs a tri-state overrunning clutch that can be controlled in an overrun state, an engaged state or a disengaged state, and thereby makes the control easier.

In an aspect of the present invention, a hybrid power driving system is provided, which comprises: a first subsystem designed to input/output power; a second subsystem designed to input/output power; a driving shaft designed to receive power from the first subsystem and/or the second subsystem or output power to the first subsystem and/or the second subsystem; and a tri-state overrunning clutch designed to connect the first subsystem and the second subsystem and may be in an overrun state, an engaged state or a disengaged state. The first subsystem and the second subsystem can comprise an engine, a motor, and a clutch, etc., respectively.

In such a hybrid power driving system, when the tri-state overrunning clutch is in the engaged state, the first subsystem and the second subsystem are coupled to each other and work together. When the tri-state overrunning clutch is in the disengaged state, the first subsystem and the second subsystem can work separately without any interference to each other. Therefore, the structure is simple and the control is convenient.

In another aspect of the present invention, a hybrid power driving system is provided, which comprises an engine, a first motor connected to the engine, a second motor, a driving shaft connected to the second motor, a battery electrically connected to the first motor and the second motor, and a tri-state overrunning clutch designed to connect the first motor and the second motor, and may be in an overrun state, an engaged state or a disengaged state.

In such a hybrid power driving system, when the second motor outputs torque to the driving shaft separately, if the engine stops or drives the first motor to generate electricity power, the tri-state overrunning clutch can be in the disengaged state, and thereby no interference will occur at either side of the tri-state overrunning clutch. If the engine is also required to output torque to the driving shaft, the tri-state overrunning clutch can be switched from the disengaged state to the overrun state (i.e., the second working face of the wedge is returned back to contact with the corresponding working face), and then the tri-state overrunning clutch will be switched from the overrun state to the engaged state automatically as the engine speed increases. Therefore, the hybrid power driving system is not only simple in structure but also convenient for control.

In another aspect of the present invention, a driving method for hybrid power driving system is provided, wherein the driving system comprises an engine, a first motor connected to the engine, a second motor, a driving shaft connected to the second motor, a battery electrically connected to the first motor and the second motor, and a tri-state overrunning clutch designed to connect the first motor and the second motor and may be in an overrun state, an engaged state, or a disengaged state; the driving method comprises: controlling the tri-state overrunning clutch to work in the overrun state, the engaged state, or the disengaged state according to the torque requirement of the driving shaft and the charge value of the battery, when the second motor outputs torque to the driving shaft.

For example, when the second motor outputs torque to the driving shaft, if the torque requirement of the driving shaft is higher than the maximum torque available from the second motor, the tri-state overrunning clutch can be switched from the disengaged state to the overrun state, and then the engine can be started up; as the rotation speed of the engine increases, the tri-state overrunning clutch will be switched from the overrun state to the engaged state automatically. If the torque requirement of the driving shaft is lower than the maximum torque available from the second motor but the charge value of the battery is lower than the preset value, the engine can be started up to drive the first motor to generate electricity power and supply the power to the battery or the second motor; in that case, the tri-state overrunning clutch can be in the disengaged state, so as to avoid interference at both sides of the tri-state overrunning clutch and avoid abrasion of the tri-state overrunning clutch.

The additional characteristics and corresponding advantages of the present invention will be described in the following embodiments.

DETAILED DESCRIPTION OF CERTAIN INVENTIVE EMBODIMENTS

Hereunder the present invention will be described in detail with reference to the embodiments and the accompanying drawings.

Tri-State Overrunning Clutch

Firstly, the tri-state overrunning clutch according to the present invention will be described in detail with reference to FIGS. 1-13.

Figure 1:
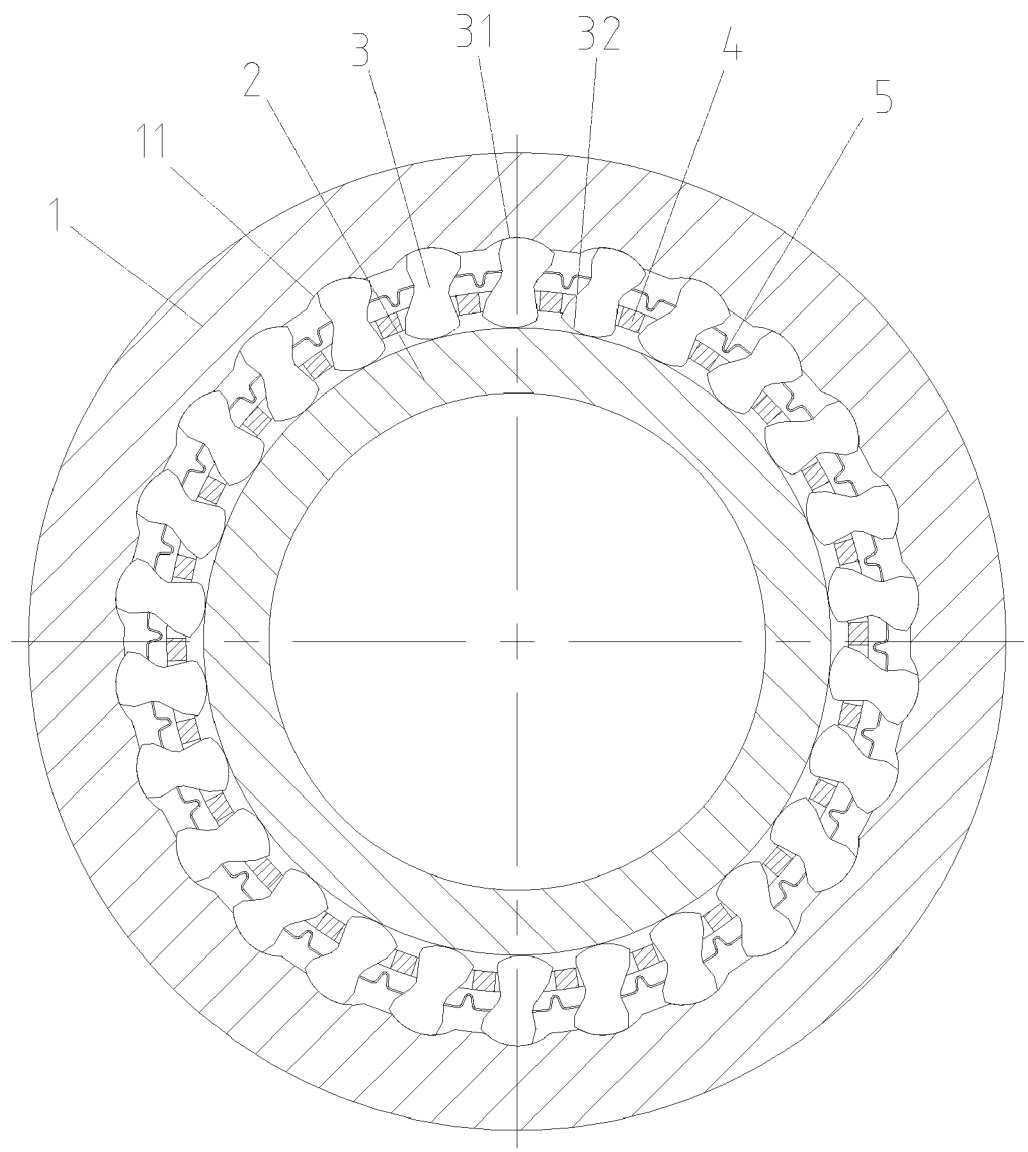
FIG. 1 is a cross-sectional view of the tri-state overrunning clutch in an embodiment of the present invention.

As shown in FIG. 1, the present invention provides a tri-state overrunning clutch, which comprises: an outer race 1; an inner race 2; a plurality of wedges 3 arranged between the outer race 1 and the inner race 2, each wedge 3 has a first end face 31 and a second end face 32 that are opposite to each other and contact with the corresponding working faces of the outer race 1 and the inner race 2; and a retainer 4 arranged between the outer race 1 and the inner race 2 for retaining the wedges 3. The wedges 3 can rotate between the outer race 1 and the inner race 2, such that the second end face 31 can leave away from its corresponding working face, so that the outer race 1 and the inner race 2 are disengaged from each other, and thereby the disengaged state of the tri-state overrunning clutch is obtained.

In the present invention, the wedges 3 can be driven to rotate between the outer race 1 and the inner race 2 in a variety of ways, such as by manual driving, electric driving, pneumatic driving, hydraulic driving, or electromagnetic driving, etc.

In an embodiment, as shown in FIG. 1, the working face of the outer race 1 has a plurality of arc grooves 11, where the first end faces 31 of the wedges 3 are retained. In addition, the tri-state overrunning clutch can comprise a drive unit designed to drive the retainer 4 to rotate relatively to the outer race 1. Since the first end face 31 of each wedge 3 is retained in the arc groove 11 on the working face of the outer race 1, the movement of the retainer 4 can drive the wedges 3 to rotate around their first end faces 31 respectively, and thereby the second end faces 32 will be controlled to leave from the working face of the inner race 2 or return back to contact with the working face of the inner race 2. As shown in FIG. 1, when the retainer 4 rotates in counter clockwise direction, it will drive the wedges 3 so that the second end face 32 of each wedge 3 can leave from the working face of the inner race 2, such that the tri-state overrunning clutch is in disengaged position; in contrast, when the retainer 4 rotates in clockwise direction, it will drive the wedges 3 so that the second end face of each wedge 3 will turn back to contact with the working face of the inner race 2, such that the tri-state overrunning clutch will return to engaged position again. In that way, the tri-state overrunning clutch can be controlled to switch between the engaged position and the disengaged position; so the structure is simple and the operation is reliable.

Figure 7:
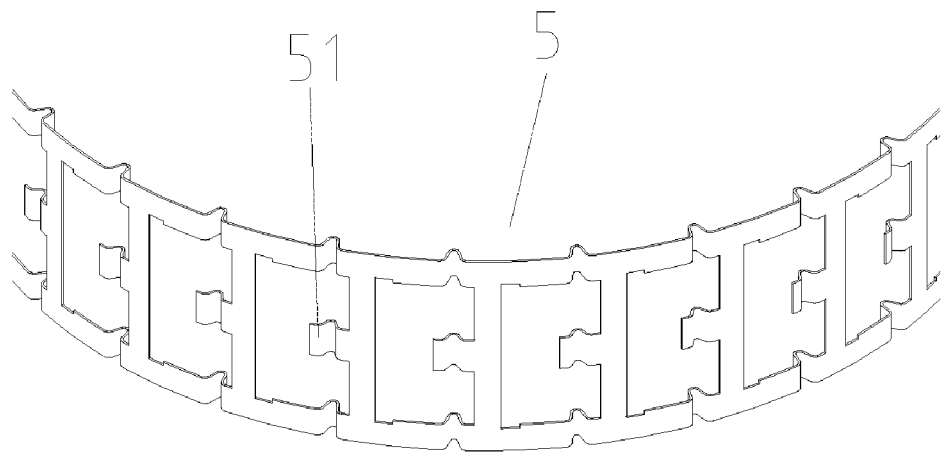
FIG. 7 is a solid view of the preloaded spring provided in the present invention.

To ensure the first end faces 31 of the wedges 3 can be retained in the arc grooves 11 stably, a preloaded spring 5 can be arranged between the inner race 2 and the outer race 1 to produce pre-tightening force to press the first end faces 31 of the wedges 3 in the arc grooves 11 and make the wedges 3 tend to rotate in the engaged direction. FIG. 7 shows a spring belt, which may be used as the preloaded spring 5.

As shown in FIG. 7, the spring belt or preloaded spring 5 has a spring blade 51, which pushes the wedge 3 towards the arc groove 11 and makes the wedge 3 tend to rotate in the engaged direction. The preloaded spring 5 in the present invention can be any resilient component, not limited to the fore-mentioned spring belt, as long as the resilient component can press the first end face 31 of the wedge 3 in the arc groove 11 and make the wedge 3 tend to rotate in the engaged direction.

Figure 2:
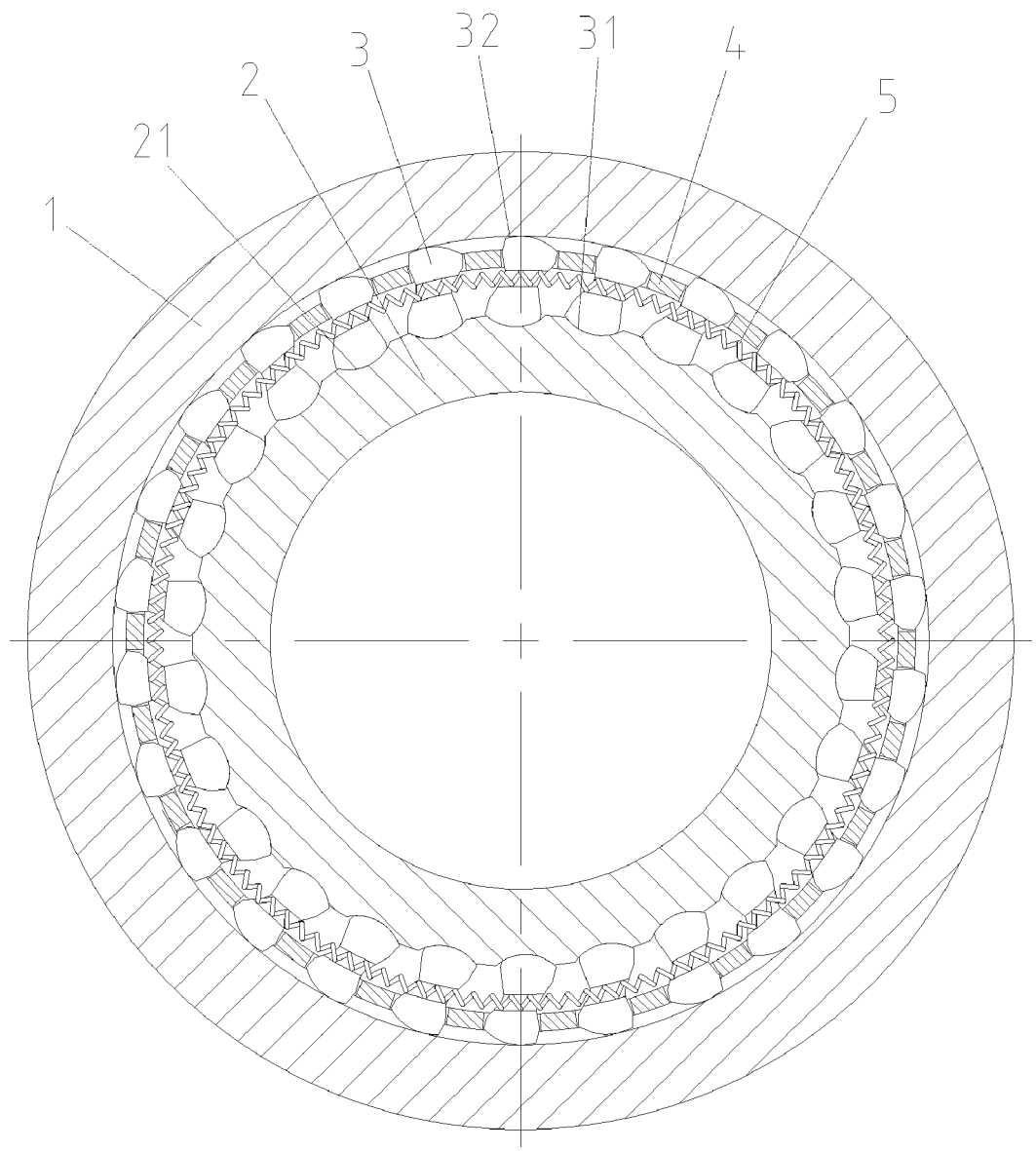
FIG. 2 is a cross-sectional view of the tri-state overrunning clutch in another embodiment of the present invention.

FIG. 2 shows the tri-state overrunning clutch provided in a second embodiment of the present invention. Compared to the tri-state overrunning clutch provided in the first embodiment, the difference of the tri-state overrunning clutch in the second embodiment lies in that an arc groove 21 is arranged on the working face of the inner race 2, the first end face 31 of the wedge 3 is retained in the arc groove 21, and thereby the wedge 3 can be driven via the retainer 4 to rotate around the first end face 31, in a way similar to that in the first embodiment.

In addition, in this embodiment, the preloaded spring 5 can be implemented simply with a retractable helical spring which is provided through the through holes in the wedges 3 to retain the first end faces 31 of the wedges 3 in the arc grooves 21 firmly; furthermore, by designing the position of the through hole in the wedge 3 appropriately, the preloaded spring 5 can make the wedge 3 tend to rotate in the engaged direction.

Figure 3:
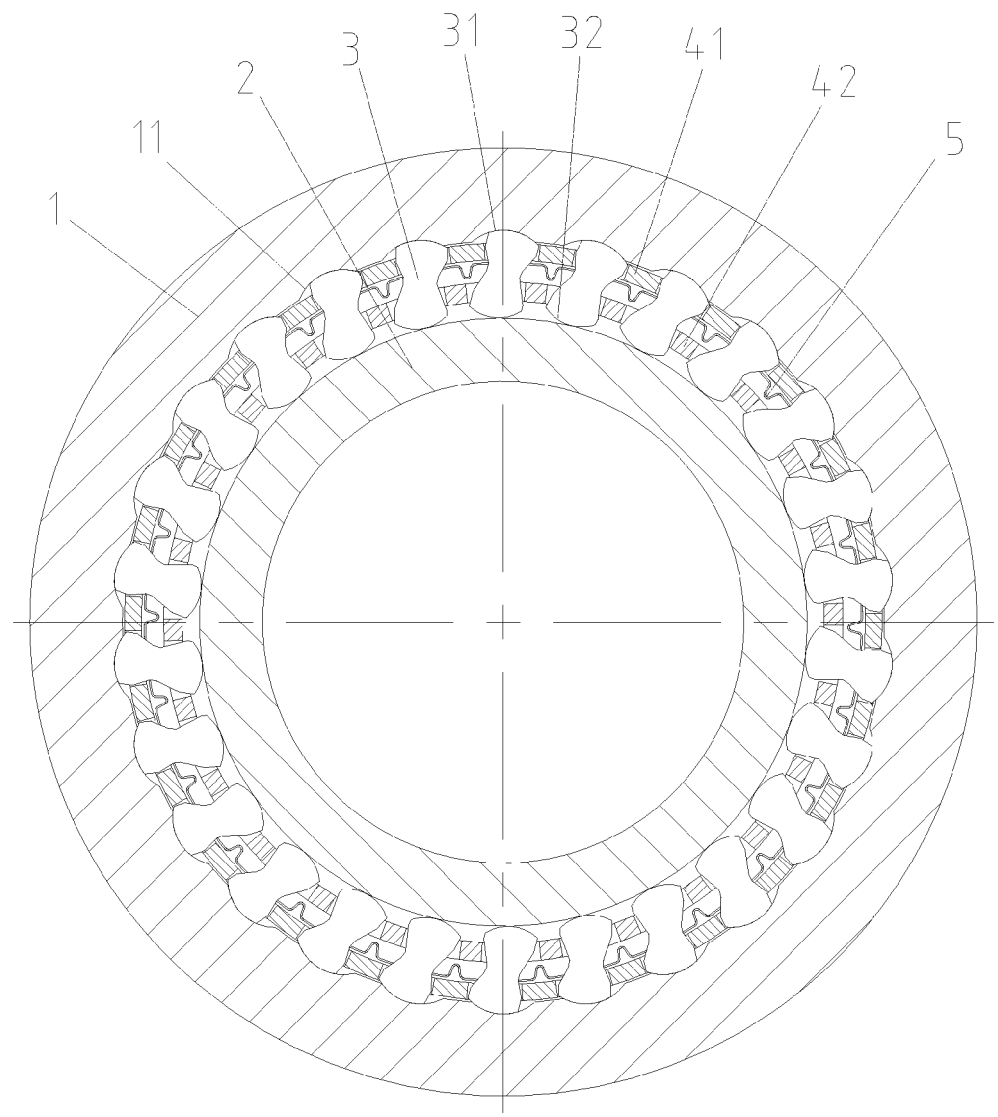
FIG. 3 is a cross-sectional view of the tri-state overrunning clutch in another embodiment of the present invention.

FIG. 3 shows the tri-state overrunning clutch provided in a third embodiment of the present invention. Different to the retainer in the first embodiment, the retainer 4 in this embodiment employs a dual-retainer structure which comprises an outer retainer 41 and an inner retainer 42. Such a dual-retainer structure can improve the bearing capacity and service life of the tri-state overrunning clutch provided in the present invention. When the inner retainer 42 rotates relatively to the outer retainer 41 and the outer race 1, the outer retainer 41 can follow the wedge 3 to rotate, without affecting the rotation of the wedge 3, i.e., the outer retainer 41 will not hamper the first end face 31 of the wedge 3 to leave from the working face of the inner race 2 or contact with the working face of the inner race 2 again.

Figure 4:
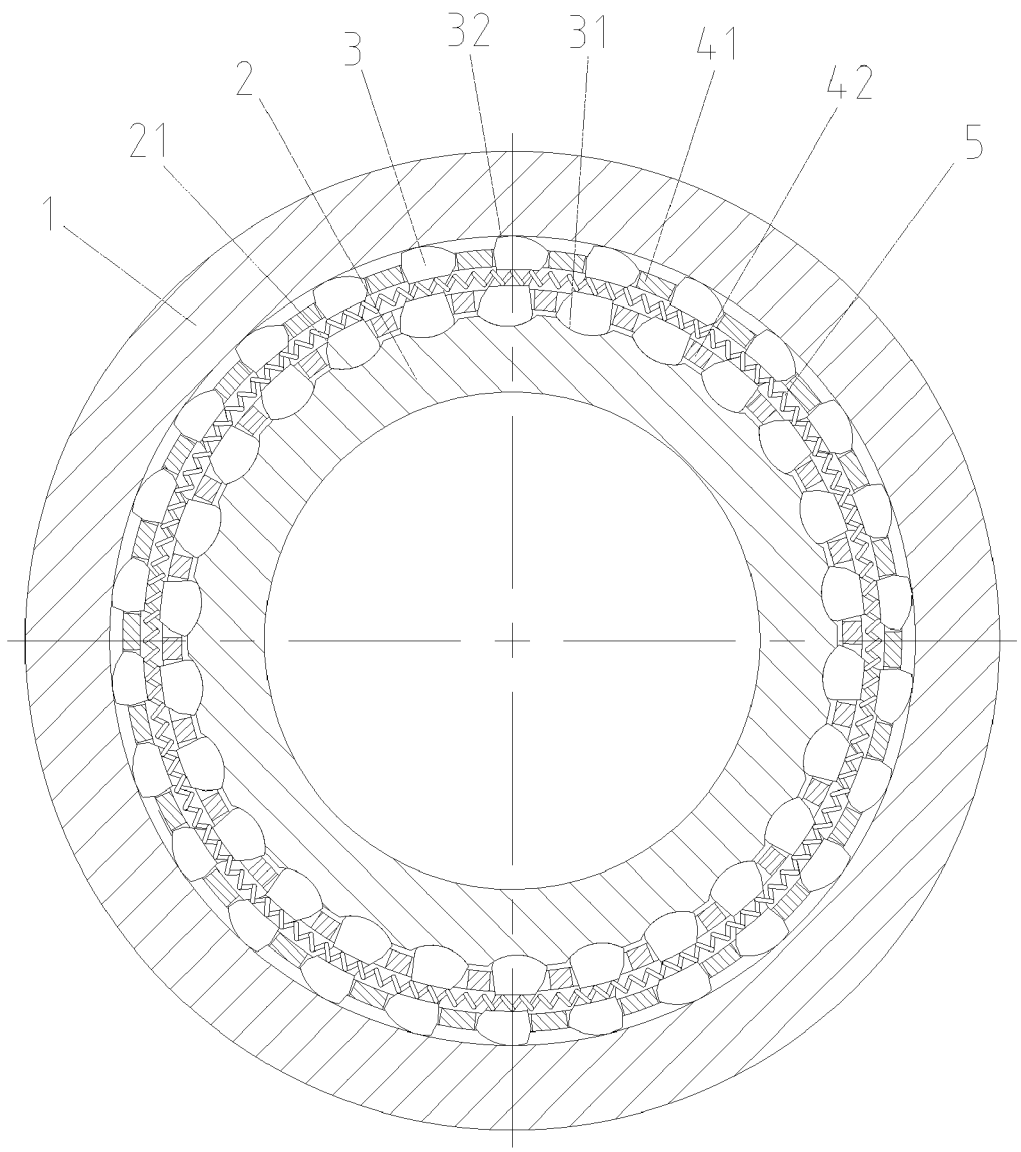
FIG. 4 is a cross-sectional view of the tri-state overrunning clutch in another embodiment of the present invention.

FIG. 4 shows the tri-state overrunning clutch provided in a fourth embodiment of the present invention. Compared to the third embodiment described above, the difference of the fourth embodiment lies in that an arc groove 21 is arranged on the working face of the inner race 2, the first end face 31 of the wedge 3 is retained in the arc groove 21, so that the wedge 3 can be driven via the outer retainer 41 to rotate around the first end face 31, in a way similar to that in the third embodiment.

In addition, similar to the preloaded spring 5 in the second embodiment described above, the preloaded spring 5 in this embodiment can be also implemented simply with a retractable helical spring, which is arranged through the through holes in the wedges 3, and the first end face 31 of the wedge 3 is also retained in the arc groove 21; in addition, by designing the position of the through holes in the wedges 3 appropriately, the spring 5 can make the wedges 3 tend to rotate in the engaged direction.

Figure 5:
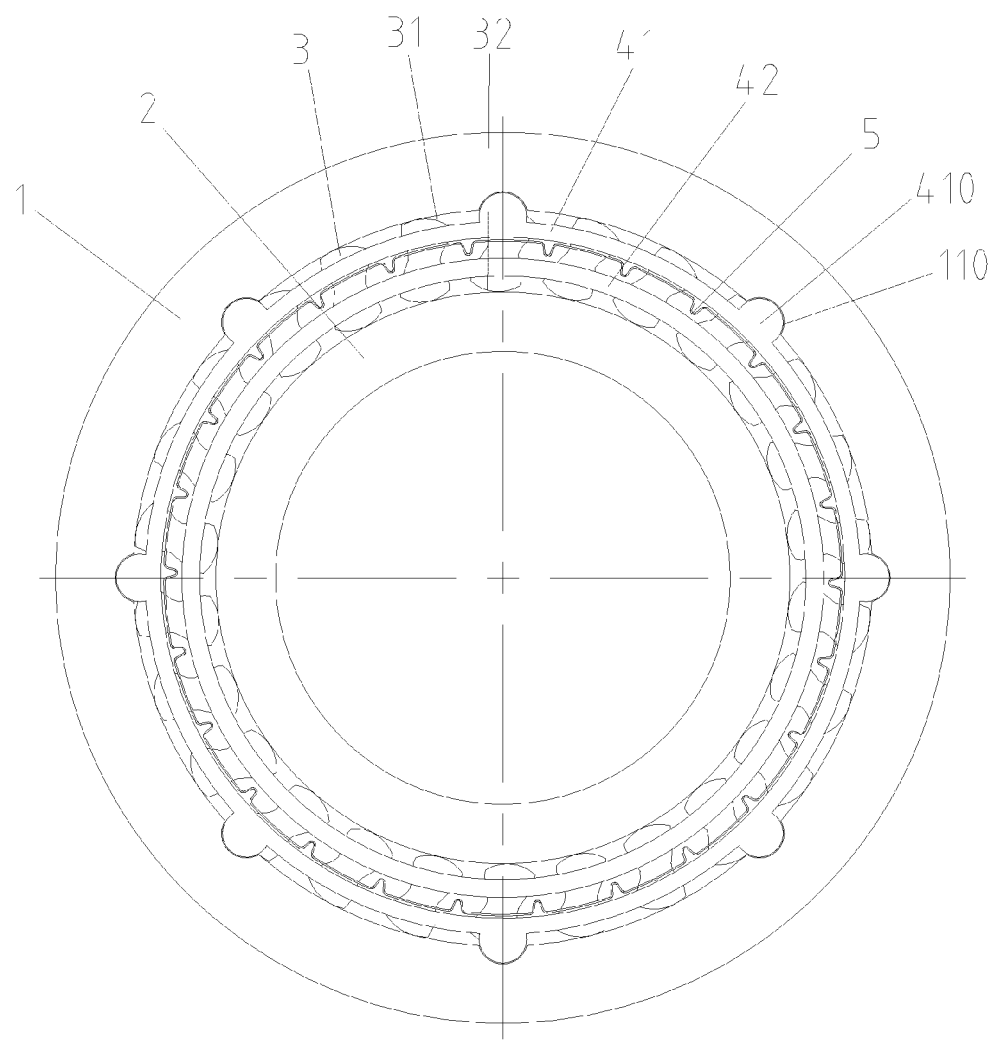
FIG. 5 is a structural representation of the tri-state overrunning clutch in another embodiment of the present invention.

FIG. 5 shows the tri-state overrunning clutch provided in a fifth embodiment of the present invention. Compared to the third embodiment described above, the difference of this embodiment lies in that no arc groove 11 is arranged on the working face of the outer race 1; instead, the relative rotation between the outer retainer 41 and the inner retainer 42 is implemented by fixing the outer retainer 41 to the outer race 1, and thereby the wedge 3 can be rotated.

The outer retainer 41 can be fixed to the outer race 1 by any means known in the art, such as bolt fastening, riveting, or wedging, etc. For example, as shown in FIG. 5, bulges 410 can be arranged on the outer retainer 41, and corresponding recesses 110 can be arranged on the working face of the outer race 1, and the bulges 410 can be inserted or retained in the recesses 110, so as to fix the outer retainer 41 to the outer race 1. In addition, in order to prevent hampering the rotation of the wedge 3, the arc groove 11 or 21 described above is not necessary in this embodiment.

Figure 6:
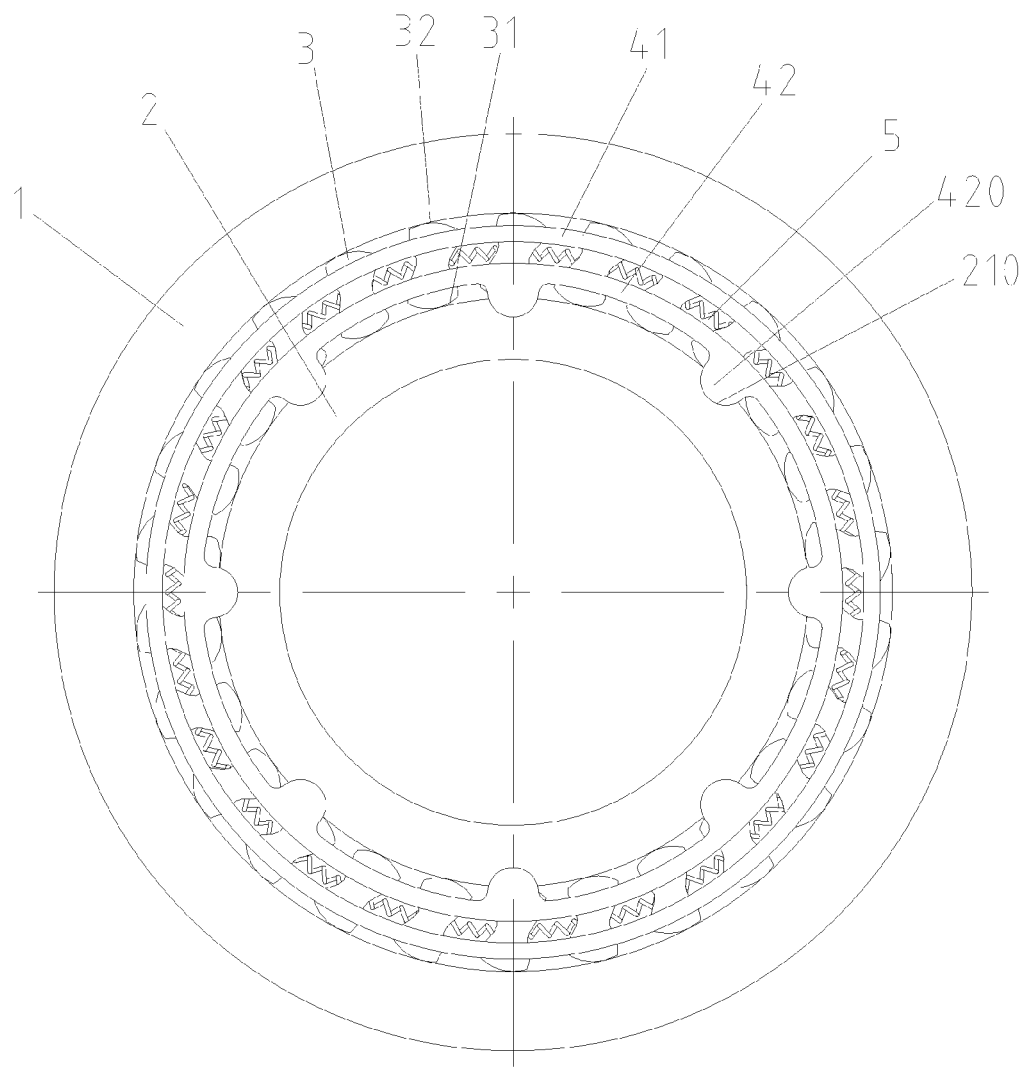
FIG. 6 is a structural representation of the tri-state overrunning clutch in another embodiment of the present invention.

FIG. 6 shows the tri-state overrunning clutch provided in a sixth embodiment of the present invention. Compared to the fifth embodiment described above, the different of this embodiment lies in that the inner retainer 42 is fixed to the inner race 2, so that the wedge 3 can be driven to rotate by driving the outer retainer 41 to rotate relatively to the inner retainer 42. In this embodiment, the preloaded spring 5 can also be implemented simply with a retractable helical spring, which is arranged through the through holes in the wedges 3 to retain the first end faces 31 of the wedges 3 on the working face of the inner race 2 firmly; furthermore, by designing the position of the through hole in the wedge 3 appropriately, the spring 5 can make the wedge 3 tend to rotate in the engaged direction.

As described above, the rotation of the wedge 3 between the outer race 1 and the inner race 2 can be implemented in a variety of ways. Hereunder the applicant will describe the drive unit that is designed to drive the wedge 3 to rotate with reference to some embodiments. The applicant will describe the drive unit on the basis of the third embodiment shown in FIG. 3. Obviously, the drive unit described below is also applicable to other embodiments described above. In order to avoid unnecessary repetition, the description of application of the drive unit in other embodiments will be omitted.

Figure 8:
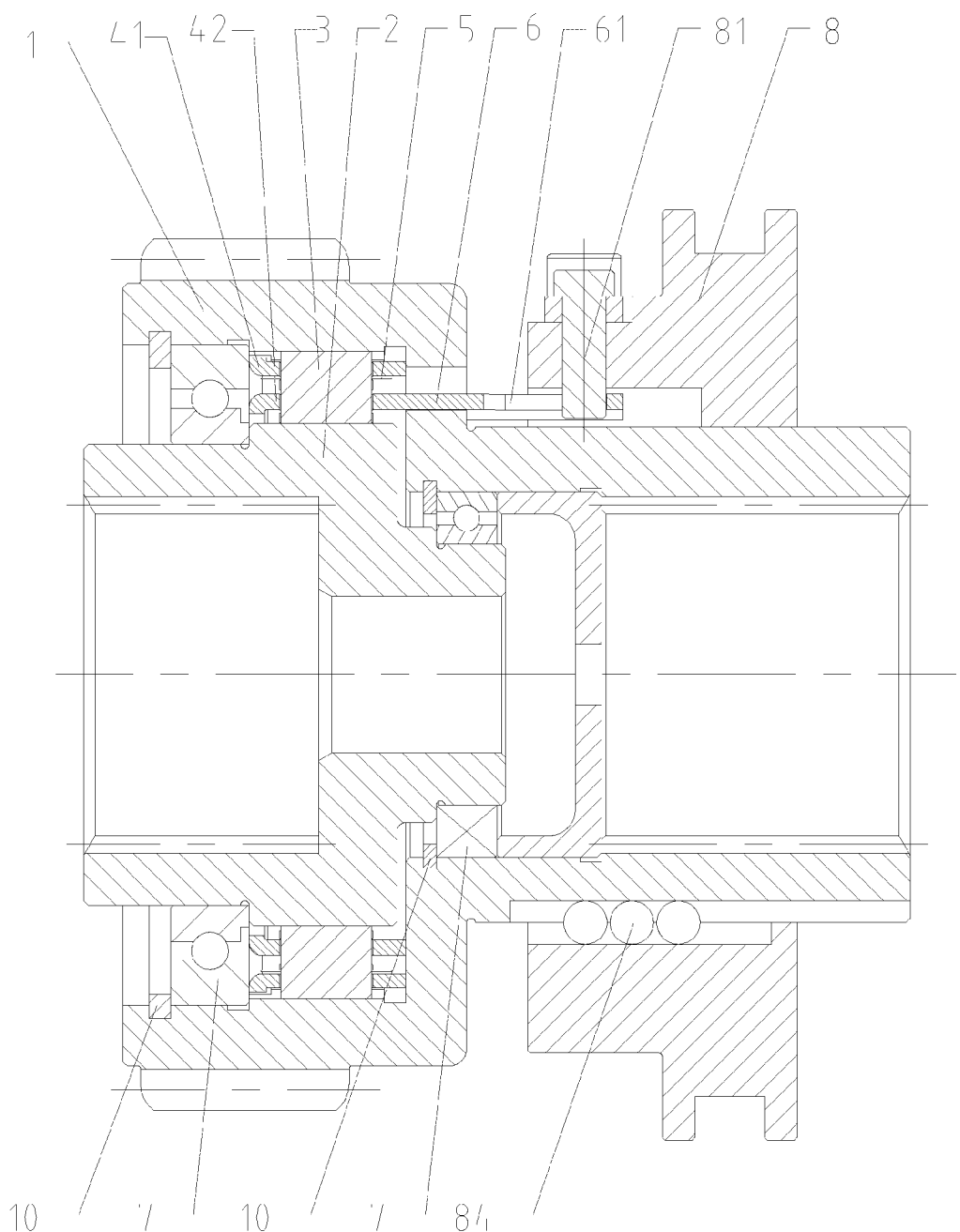
FIG. 8 is a sectional view of the tri-state overrunning clutch with a shifting disk in an embodiment of the present invention.
Figure 9:
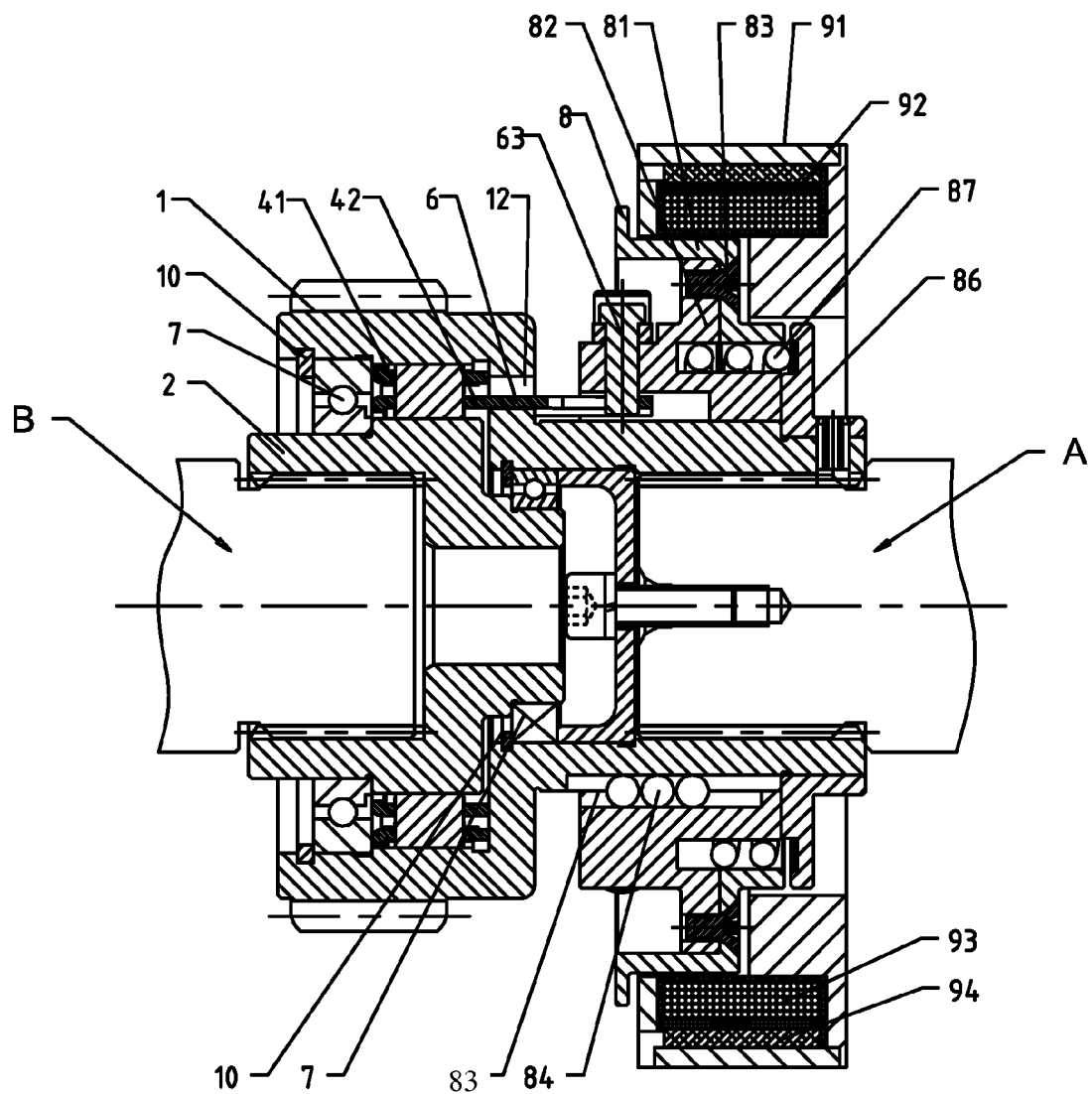
FIG. 9 is a sectional view of the tri-state overrunning clutch with an electromagnetic driving mechanism in an embodiment of the present invention.
Figure 10:
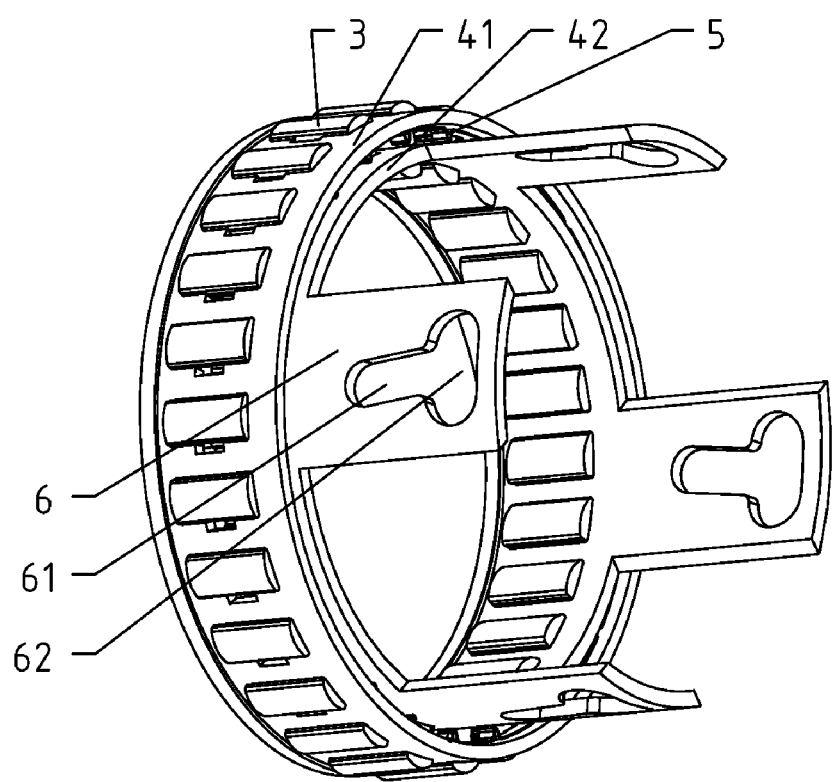
FIG. 10 is a solid view of the inner and outer retainers that retain wedges therein as shown in FIG. 8 and FIG. 9.
Figure 11:
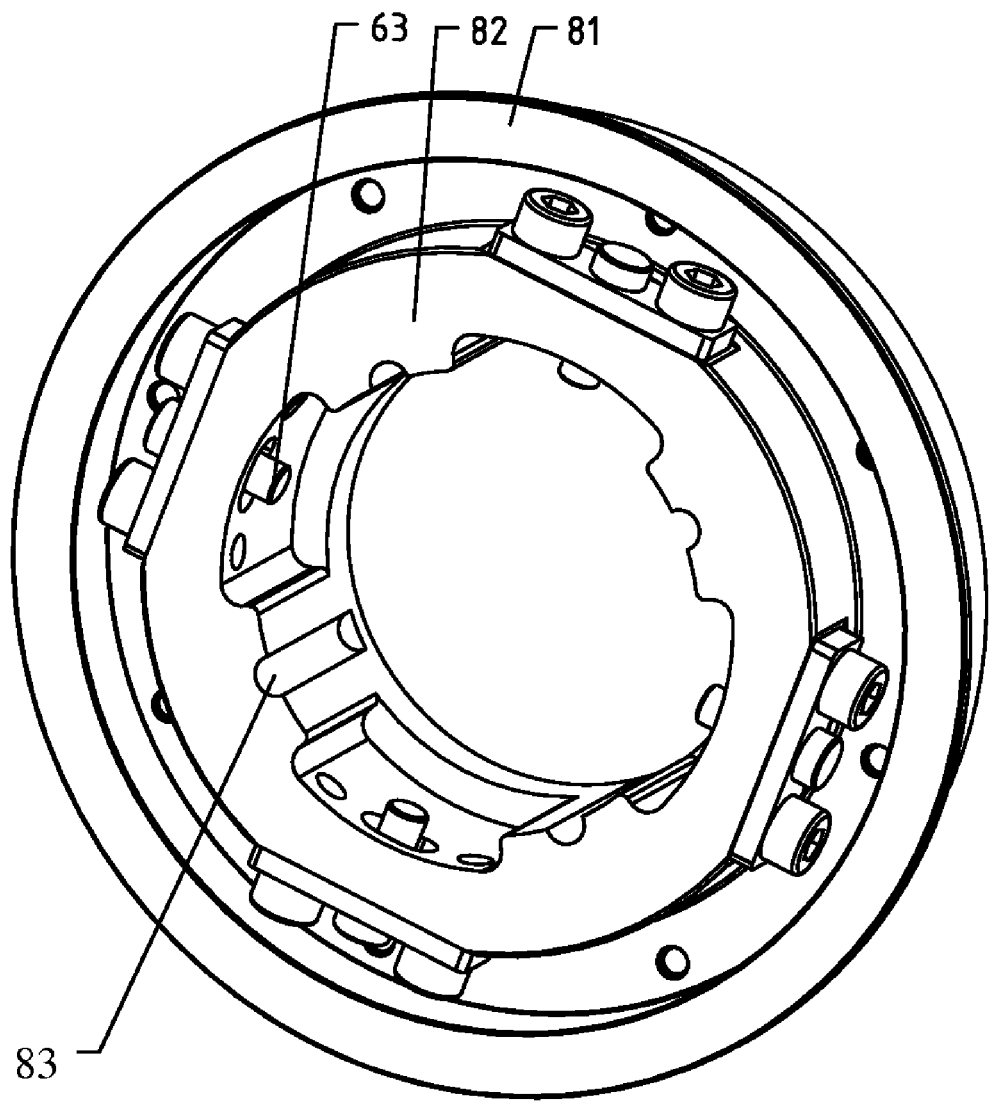
FIG. 11 is a solid view of the shifting disk with a shifting lever as shown in FIG. 8 and FIG. 9.
Figure 12:
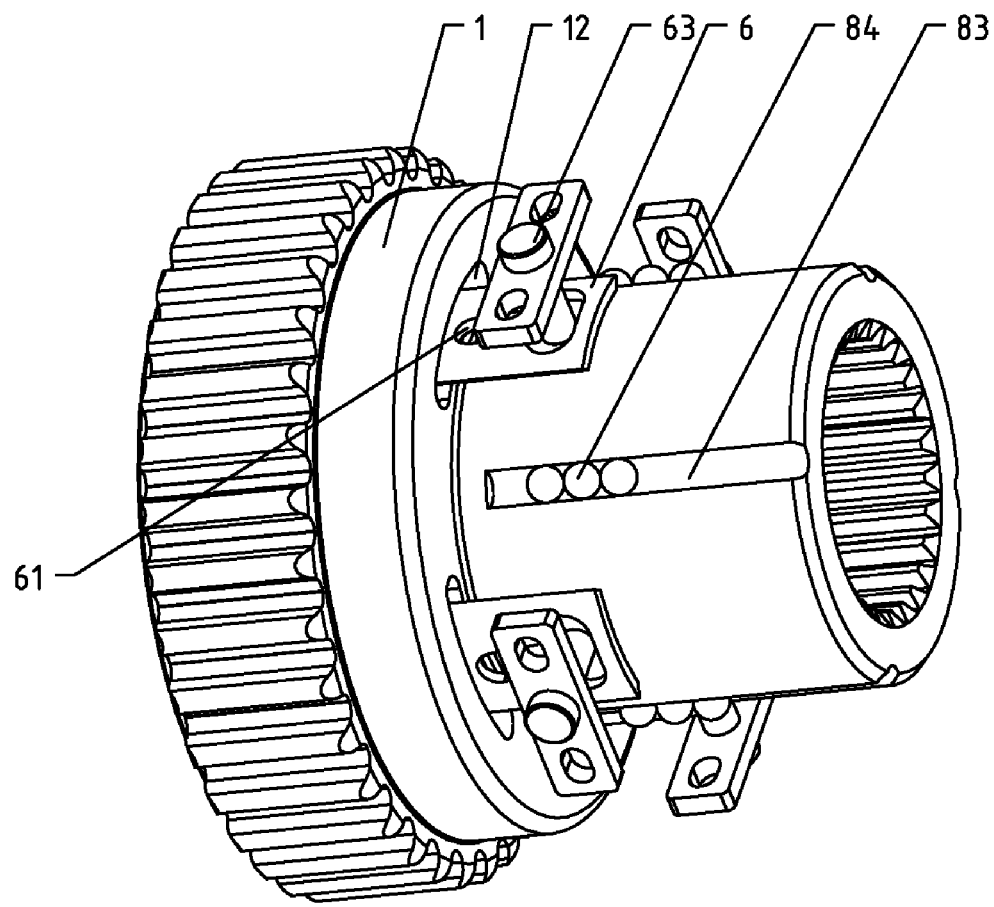
FIG. 12 is a solid view of the tri-state overrunning clutch as shown in FIG. 8 and FIG. 9, with the shifting disk removed for illustration purpose.
Figure 13:
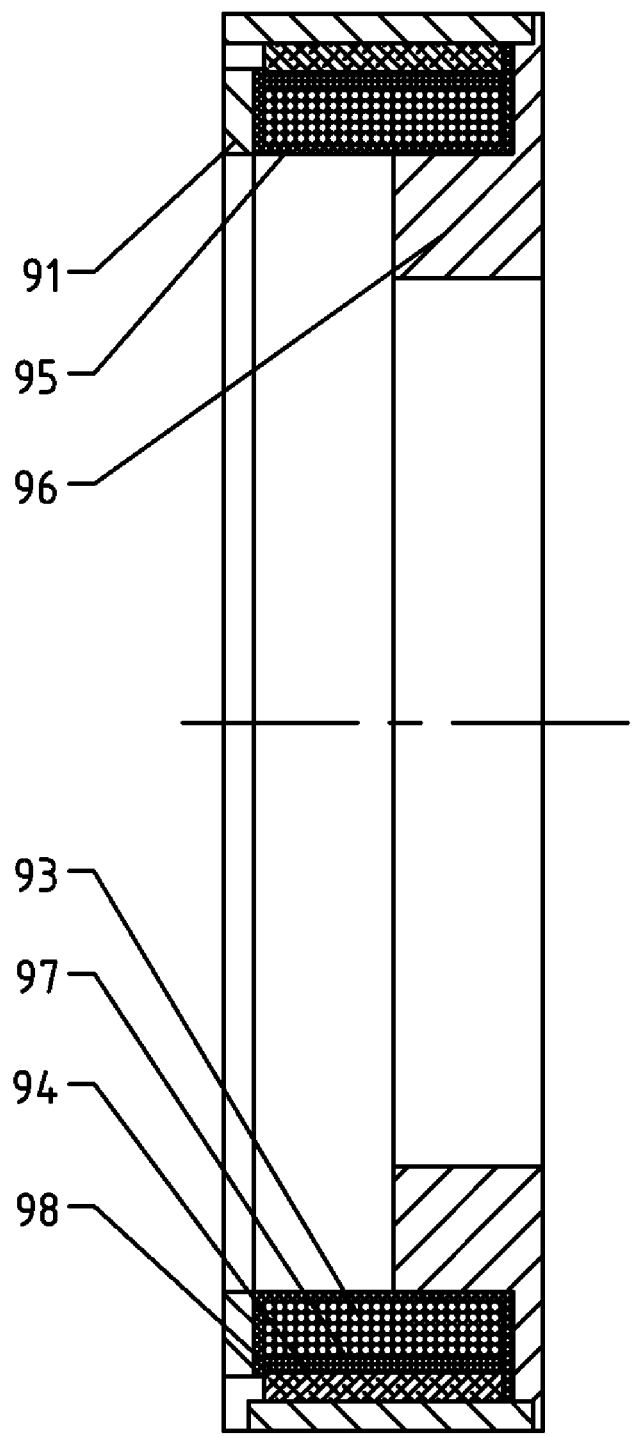
FIG. 13 is a sectional view of the electromagnetic driving mechanism as shown in FIG. 9.

FIG. 8 is a sectional view of the tri-state overrunning clutch with a shifting disk in an embodiment of the present invention. FIG. 9 is a sectional view of the tri-state overrunning clutch with an electromagnetic driving mechanism in an embodiment of the present invention. FIG. 10 is a solid view of the inner and outer retainers that retain wedges as shown in FIG. 8 and FIG. 9. FIG. 11 is a three-dimensional view of the shifting disk with a shifting lever as shown in FIG. 8 and FIG. 9. FIG. 12 is a three-dimensional drawing of the tri-state overrunning clutch shown in FIG. 8 and FIG. 9, with the shifting disk removed for illustration purpose. FIG. 13 is a sectional view of the electromagnetic driving mechanism shown in FIG. 9.

As shown in FIG. 8, the inner retainer 42 has a plurality of lugs 6 extending outwards in axial direction, each of which has an inclined slot 61 that is inclined relative to the axial direction.

The drive unit can comprise a shifting disk 8, which can slide in axial direction on the outer surface of the outer race 1. A plurality of shifting levers 63 that can be inserted into corresponding inclined slots 61 are fixed on the shifting disk 8. The shifting levers 63 on the shifting disk 8 can slide through the inclined slots 61 and thereby push the lugs 6 to rotate. Under the interaction between the inner retainer 42 and the arc groove 11, the wedge 3 can rotate around its pivot end i.e., the first end face 31 between the inner race and the outer race, so that the second end face 32 opposite to the first end face 31 of the wedge 3 can leave from or contact with the working face of the inner race 2 accordingly. In that way, the tri-state overrunning clutch can be controlled simply and reliably.

The lugs 6 can be formed with the inner retainer 42 integral, and each lug 6 has an inclined slot 61 that is inclined relative to the axial direction. Alternatively, the inclined slot 61 on each lug 6 can be a non-perforated inclined recess bored in certain depth. However, since the thickness of the lug 6 is not big, if an inclined recess is formed, the depth of the inclined slot will be smaller, and therefore is adverse for the shifting lever 62 to slide in axial direction along the slot; therefore, in the present invention, an inclined through slot 61 is preferred. The outer end of the inclined slot 61 can be open or closed. In this embodiment, the outer end of the inclined slot 61 is closed. Alternatively, the inclined slot 61 can be a straight slot or an arc or helical slot, depending on the demand.

As shown in FIG. 10, an enlarged hole 62 with increased width can be arranged at one end of the inclined slot 61. In that case, when the tri-state overrunning clutch provided in the present invention is to be used as a conventional one-way overrunning clutch, the shifting lever 63 on the shifting disk 8 can be moved into the enlarged hole 62, so as to prevent the operation of the overrunning clutch by careless or other unexpected things. As an alternative, the outer end of the inclined slot 61 can be arranged as an open end, which can also implement such a safeguard function to some extent.

The position of the wedge 3 between the outer race 1 and the inner race 2 can be adjusted or controlled by controlling the shifting disk 8 to slide in axial direction on the outer race 1. As the shifting disk 8 slides in axial direction, the shifting lever 63 on the shifting disk 8 can slide through the inclined slot 61 and thereby push the lug 6 having the slot 61. Since the inclined slot 61 is inclined at a certain angle relative to the axial direction or the axis, it can drive the inner retainer 42 to rotate by corresponding angle relative to the outer race 1. In addition, since the first end face 31 of the wedge 3 is retained in the arc groove 11 on the working face of the outer race 1 firmly, the wedge 3 retained by the inner retainer 42 and the outer retainer 41 can rotate by corresponding angle around the first end face 31 between the inner race and the outer race, and thereby causes the second end face 32 of the wedge 3 to leave from the working face of the inner race 2 accordingly; in that way, the inner race and the outer race can rotate freely in normal and reverse directions, thus the third working state i.e., disengaged state of the overrunning clutch can be implemented.

As shown in FIG. 8, the outer race 1 can be shaped as a stepped shaft; in addition, the shifting disk 8 can be arranged on the smaller diameter part of the stepped shaft, so that the structure of the overrunning clutch will be more compact. In that case, as shown in FIG. 12, a plurality of windows 12 can be arranged on the step part of the stepped shaft, so that the lugs 6 of the inner retainer 42 can protrude outwards through the corresponding windows 12. Furthermore, the inner race 2 can also be manufactured into a stepped shaft corresponding to the outer race 1, so that the structure of the overrunning clutch can be designed more compact.

In the present invention, the sliding in axial direction and locking in circular direction of the shifting disk 8 on the outer surface of the outer race 1 can be implemented by any appropriate means, for example, a commonly used key-slot means or a key-slot means can be used. As shown in FIG. 11 and FIG. 12, in an embodiment of the present invention, axial roller tracks 83 can be arranged on the inner surface of the shifting disk 8 and the outer surface of the outer race 1 respectively, and a plurality of rollers 84, e.g. steel balls, can be arranged in the roller tracks 83, so as to easily enable the shifting disk 8 to slide in axial direction on the outer race 1.

A bearing 7 can be arranged between the inner race 2 and the outer race 1, and the bearing 7 can be fixed with the shaft shoulder and/or retaining ring 10 on the inner race 2 and outer race 1, so as to implement accurate radial positioning of the bearing 7 between the inner race 2 and the outer race 1 and ensure the overrunning clutch work stably and reliably.

The shifting disk 8 can be driven by any means known in the art, for example, it can be driven by manual, electrical, hydraulic, or pneumatic means, etc.

In a preferred embodiment of the present invention, the shifting disk 8 is driven by an electromagnetic drive mechanism to slide in axial direction on the outer race 1.

As shown in FIG. 9, the electromagnetic drive mechanism utilizes electromagnetic force to drive the shifting disk 8 to slide in axial direction on the outer race 1, and thereby drives the shifting lever 63 of the shifting disk 8 to slide in the inclined slot 61 of the lug 6, and thus controls the position of the wedge 3 and controls the tri-state overrunning clutch. Hereunder the electromagnetic drive mechanism 9 will be detailed in an embodiment.

As shown in FIG. 9 and FIG. 13, the electromagnetic drive mechanism 9 mainly comprises a fixed case 91 and an electromagnetic coil 92 mounted in the case 91. There is certain clearance between the case 91 and the shifting disk 8, so as to enable the shifting disk 8 to slide in axial direction on the outer surface of the outer race 1 using the magnetic force produced by the electromagnetic coil 92 and rotate along with the outer race 1 without interfering with the electromagnetic drive mechanism 9. The case 91 can be fixed to the base (not shown) of the tri-state overrunning clutch; or, it can be fixed to the machine or equipment that utilizes the tri-state overrunning clutch, such as an vehicle. The electromagnetic coil 92 can be wound on a spool 95. The spool 95 with the electromagnetic coil 92 can be fixed in the case 91 by a rear cover 96. When the electromagnetic coil 92 is electrified, it produces electromagnetic force and pull the shifting disk 8 to slide in axial direction on the outer race 1, and thereby controls the wedge 3 to rotate by a angle around the arc groove 11 on the outer race 1 under the interaction of the shifting lever 63 and the lug 6, and causes the second end face 32 of the wedge 3 to leave from the working face of the inner race 2 or contact with the working face of the inner race 2, and thereby controls the tri-state overrunning clutch. In some embodiments, an electromagnetic coil 92 can be arranged on each side of the shifting disk 8, so that the shifting disk 8 can slide forwards and backwards on the outer race 1. Alternatively, an electromagnetic coil 92 can be arranged only on one side of the shifting disk 8, and a permanent magnet can be arranged on the shifting disk 8, so as to provide current in reverse direction to the electromagnetic coil 92 and thereby produce electromagnetic force in reverse direction, to enable the shifting disk 8 to slide forwards and backwards.

However, in order to simplify the structure, preferably an electromagnetic coil 92 is arranged only on one side of the shifting disk 8, and a return spring is utilized to return the shifting disk 8.

As shown in FIG. 9, a baffle 86 and a return spring 87 can be arranged on outer side of the shifting disk 8. The baffle 86 is fixed to the circumference of the outer race 1, and the return spring 87 is arranged between the shifting disk 8 and the baffle 86. Preferably, a spring receiving groove can be arranged on outer end (e.g. the right end in FIG. 9) of the shifting disk 8, wherein the return spring 87 is received, while the free end (right end) of the return spring 87 is blocked by the baffle 86. As an alternative, the spring receiving groove can be arranged in the baffle 86 or between the shifting disk 8 and the baffle 86 as required, as long as the spring receiving groove can retain the return spring 87. In this embodiment, when the electromagnetic coil 92 is electrified, the electromagnetic force produced by the electromagnetic coil 92 can pull the shifting disk 8 to right against the spring force of the return spring 87, and thereby causes the wedge 3 to rotate by a certain angle. When the power supply to the electromagnetic coil 92 is cut off, the shifting disk 8 will return to its original position under the spring force of the return spring 87, and thereby drive the wedge 3 back to its original position.

In some embodiments, the electromagnetic coil 92 comprises a pulling coil 93 and a retaining coil 94 which together produce electromagnetic force to pull the shifting disk 8 outwards to an out side position against the spring force of the return spring 87, and the electromagnetic force produced by the retaining coil 94 can retain the shifting disk 8 at the outer side position. That is to say, to make the shifting disk 8 slide outwards, the pulling coil 93 and the retaining coil 94 can be electrified at the same time to produce electromagnetic force together sufficient to pull the shifting disk 8 outwards against the spring force of the return spring 87. When the shifting disk 8 has slid to the out side position, i.e., the wedge 3 has rotated by a certain angle, the power supply to the pulling coil 93 can be cut off, while the retaining coil 94 is kept electrified so as to retain the shifting disk 8 at the out side position. In that way, the spring force of the return spring 87 can be overcome reliably to make the shifting disk 98 slide, while the power consumption of the electromagnetic drive mechanism 9 can be minimized. As shown in FIG. 8, the pulling coil 93 and the retaining coil 94 can be isolated from each other with a piece of insulating paper 67; in addition, heat-conducting silicon gel 68 can be filled between the pulling coil 93 and the case 91 as well as between the retaining coil 94 and the case 91, so as to exhaust the heat produced by the electromagnetic coil immediately.

In some embodiments, the shifting disk 8 can comprise a magnetic conducting outer disk 81 and a non-magnetic conducting inner disk 82 that are tightened together with fasteners e.g., tightening screws 83, wherein, the outer disk 81 is close to the electromagnetic drive mechanism 9, and the shifting lever 63 is fixed to the inner disk 82. Since the outer disk 81 can conduct magnetism, the shifting disk 8 can be driven by the electromagnetic drive mechanism 8; in addition, since the inner disk 82 doesn't conduct magnetism, it can prevent interference of the electromagnetic force produced by the electromagnetic drive mechanism 9 to other parts of the tri-state overrunning clutch.

Moreover, as shown in FIG. 9, the inner race 2 and the outer race 1 can have one or more connection ends, such as splined connection ends or gear coupling ends, so as to connect external power units A and B such as engine and motor.

Hereunder the operation principle of the tri-state overrunning clutch provided in the present invention will be described in brief with reference to the accompanying drawings, to assist those skilled in the art to understand the present invention more clearly.

Since the inner surface of the outer race 1 is arranged with a plurality of arc grooves 11, which are fitted to the first end face 31 of the wedges 3, the wedges 3 will always rotate around the arc grooves 11 on the inner surface of the outer race 1 during the process of the wedges 3 rotate in the engaged or disengaged direction. When the outer race 1 rotates, the wedges 3, outer retainer 11, inner retainer 42, preloaded spring 5, and shifting disk 8, etc., rotate with the outer race 1. In addition, since the shifting disk 8 can slide in axial direction on the outer race 1, the shifting levers 63 assembled to the shifting disk 8 will move in the inclined slots 61 of the inner retainer 42. Since the shifting levers 63 move in axial direction and the inclined slots 61 are designed with a certain inclined angle relative to the axial direction, the inner retainer 42 will rotate by an angle when the shifting disk 8 moves in the axial direction; since the first end faces 31 of the wedges 3 are retained in the arc grooves 11 on the inner surface of the outer race 1, the wedges 3 will rotate around the arc grooves 11 on the inner surface of the outer race 1 by an angle towards the engaged direction or disengaged direction when the inner retainer 42 rotates.

The axial sliding of the shifting disk 8 is accomplished by the cooperation between the electromagnetic coil 92 including the pulling coil 93 and the retaining coil 94 and the return spring 87. Usually, when the power supply to the electromagnetic coil 92 is cut off, the shifting disk 8 will be moved to the left side and blocked by the shoulder face of the outer race 1 under the action of the return spring 87. At that time, the wedges 3 will be forced to rotate a certain angle towards the running-out direction, and the second end faces 32 of the wedges 3 will disengage from the external surface of the inner race 2 completely, and thus the inner race will disengage from the outer race no matter whether they rotate in normal direction or reverse direction, and thereby the third working state i.e., disengaged state of the clutch will be obtained. When the electromagnetic coil 92 is electrified, under the action of the electromagnetic force produced by the electromagnetic coil 92, the shifting disk 98 will overcome the resistance of the return spring 87 and move to right, and then be stopped by the baffle 86; at that time, the wedges 3 rotate back by the angle in the engaged direction, and therefore the clutch is switched back to an ordinary one-way overrunning clutch, and the shifting levers 63 are in the enlarged holes 62 at outer side of the inclined slots 61 on the lugs 6 on the inner retainer 42. Since the wedges 3 are at the engaged position, the design of the enlarged holes 62 can avoid the shifting levers 63 to affect or interfere the operation of the clutch, which may be at the overrun state or engaged state depending on various rotation speeds of the outer race and the inner race.

While the drive unit for the tri-state overrunning clutch is detailed on the basis of the third embodiment shown in FIG. 3, it is obvious that the drive unit is also applicable to any other embodiments; therefore, no further description will be provided here.

In addition, there is no limitation on the number and positions of the lugs 6 and the shifting levers 63 in the present invention in principle; however, in consideration of operation reliability, processing cost, and other factors, preferably 3-4 lugs 6 and shifting levers 63 are arranged and distributed evenly on the circumference. The wedges 3 can be in any construction and quantity as appropriate in the prior art.

Hybrid Power Driving System

Hereunder the hybrid power driving system provided in the present invention will be detailed, with reference to FIG. 14-FIG. 18.

Figure 14:
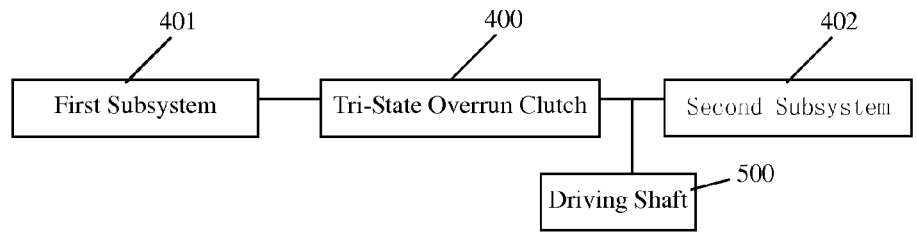
FIG. 14 is a schematic diagram of the hybrid power driving system provided in the present invention.

As shown in FIG. 14, the present invention provides a hybrid power driving system, which comprises: a first subsystem 401 designed to input/output power; a second subsystem 402 designed to input/output power; a driving shaft 500 designed to receive power from the first subsystem 401 and/or the second subsystem 402 or output power to the first subsystem 401 and/or the second subsystem 402; and, a tri-state overrunning clutch 400 designed to connect the first subsystem 401 and the second subsystem 402, wherein the tri-state overrunning clutch 400 may be in an overrun state, an engaged state, or a disengaged state.

As described above, in an embodiment, the tri-state overrunning clutch 400 can comprises: an outer race 1 that can be connected to the first subsystem 401; an inner race 2 that can be connected to the second subsystem 402; a plurality of wedges 3 disposed between the outer race 1 and the inner race 2, each wedge 3 has a first end face 31 and a second end face 32 that are opposite to each other and contact with the corresponding working faces of the outer race 1 and inner race 2; and a retainer 4 arranged between the outer race 1 and the inner race 2 for retaining the wedges 3. The wedges 3 can rotate between the outer race 1 and the inner race 2, so as to move the second end face 31 away from the corresponding working face and thereby set the tri-state overrunning clutch 400 into the disengaged state.

The first subsystem and the second subsystem can comprise a plurality of components such as engine, motor, and clutch; the engine can comprise gasoline engine, diesel engine, or an engine that utilizes other fuels such as methanol or alcohol; the motor can comprise A/C motor, switching magnetic resistant motor, or DC permanent-magnet motor, etc.

Figure 15:
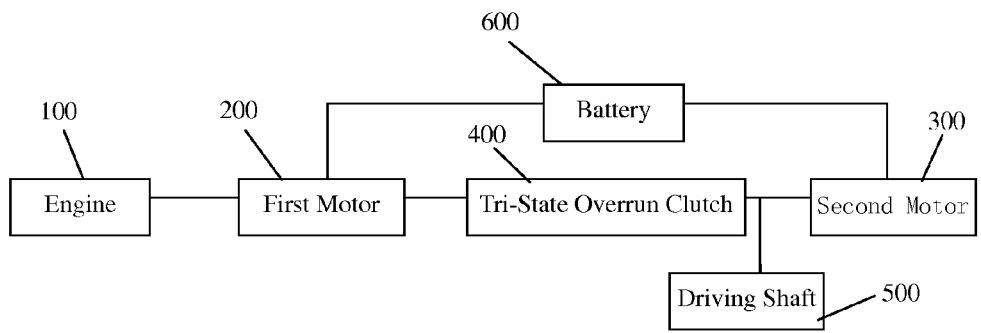
FIG. 15 is a schematic diagram of an embodiment of the hybrid power driving system shown in FIG. 14.

As shown in FIG. 15, as an embodiment, the first subsystem comprises an engine 100 and a first motor 200; the second subsystem 402 can comprise a second motor 300. The first motor 200 and the second motor 300 are electrically connected to a battery 600. The engine 100, first motor 200, tri-state overrunning clutch 400, and second motor 300 are connected in series, and a driving shaft 500 can be connected to the second motor 300.

The output shaft of the first motor 200 can be connected to the inner race 2 of the tri-state overrunning clutch, for example, as shown in FIG. 9, the end B at the left side of the inner race 2. The output shaft of the second motor 300 can be connected to the outer race 1 of the overrunning clutch, for example, as shown in FIG. 9, the end A at the right side of the outer race 1. While the driving shaft 500 can be connected to the end at the left side of the outer race 1 as shown in FIG. 9.

The driving shaft 500 is connected to the output end of the second motor 300, so as to transfer the received torque to the road wheels for propelling the vehicle. For example, the driving shaft 500 can be the input shaft of a transmission, which is connected through a chain driving mechanism to the output shaft of the second motor 300.

The battery 600 can be provided with an onboard charging device. When the battery 600 is in short of electricity storage, it can be charged with the onboard charging device, so as to reduce the use of the engine and reduce fuel consumption and environmental pollution.

The first motor 200 can function both as a generator or a motor. When the first motor 200 operates as a generator, it can be driven by the engine 100 to generate electrical power, or convert the mechanical energy from the road wheels into electrical power. When the first motor 200 operates as a motor, it can be used to start the engine 100 or output torque to the driving shaft 500 to propel the vehicle.

The second motor 300 also can function as a generator or a motor. When it operates as a generator, it can convert the mechanical energy feedback from the road wheels into electrical power. When it operates as a motor, it can output torque to the driving shaft 500 to propel the vehicle.

The first motor 200 can be designed to have higher efficiency at higher speeds than that at lower speeds, and can be used to start the engine 100 separately or drive the road wheels separately with pure electric power.

The second motor 300 can be designed to have higher efficiency at lower speeds than that at higher speeds, and can have higher power than the first motor 200. It can be used to drive the road wheels when the vehicle starts or runs at lower speeds, or drive the vehicle separately when the vehicle runs at higher speeds (e.g., cruising speed). For example, the power of the first motor 200 can be 30 kw, while the power of the second motor 300 can be 50 kw. When the vehicle needs higher traction force, the second motor 300 and the first motor 200 can be operated to drive the road wheels together and thereby provide higher torque output.

The second motor 300 can drive the vehicle separately to run at cruising speeds, so as to minimize the use of engine, reduce fuel consumption and gas discharge.

The first motor 200 can be designed to have higher efficiency than the second motor 300 at higher speeds; the second motor 300 can be designed to have higher efficiency than the first motor 200 at lower speeds. In that way, when the vehicle runs at low speeds, the second motor 300 can be used to drive the vehicle separately, and thereby improve the working efficiency. When the vehicle runs at high speeds, the first motor 200 can be used to drive the vehicle separately and thereby improve the working efficiency.

Since the high efficiency working range of the engine usually corresponds to higher speeds, during the period that the vehicle starts from stop to speeds up to this higher speeds, the motor can be used to drive the road wheels with electric power purely while the engine is not used, so as to prevent increased fuel consumption and discharge of harmful substances caused by operation of the engine within the inefficient range.

Specifically, in the hybrid power driving system, the following driving modes are available:

1. Propelled by the Second Motor Only

When the battery 600 has enough electricity storage, the second motor 300 can be used to propel the vehicle separately, while the engine 100 and the first motor 200 may be stopped. This driving mode is suitable for the event that vehicle is running on urban roads, startup and back running, and can reduce fuel consumption of the engine.

In that mode, the tri-state overrunning clutch 400 is preferably in the disengaged state, i.e., the inner race 2 and the outer race 1 can be rotated freely relative to each other and without interference with each other; therefore, even when the second motor 300 runs in reverse direction (i.e., the outer race 1 runs in reverse direction), the overrunning clutch will not be engaged and thereby pull back the second motor 200 and/or the engine 100. At this time, the tri-state overrunning clutch 400 can be kept in the disengaged state with a return spring 87 (see FIG. 9), so as to simplify the operation and improve reliability of the overrunning clutch.

2. Serial Driving Mode

When the battery 600 is in short of electricity storage, the engine 100 can be used to drive the first motor 200 to generate electricity power, so as to supply the electrical power to the battery 600 or the second motor 300 and force the second motor 300 to propel the vehicle. In that mode, the tri-state overrunning clutch 400 is preferably in the disengaged state, so as to avoid interference between the first motor 200 and the second motor 300 and abrasion of the wedges in the tri-state overrunning clutch.

3. Parallel Driving Mode

When the battery 600 has enough electricity storage and higher torque is required to propel the vehicle (e.g., when the vehicle speeds up or hill-climbs), the second motor 300 can be used to drive the vehicle, while the engine 100 and/or the first motor 200 provide assistance torque.

In that mode, the tri-state overrunning clutch 400 can be switched from the disengaged state to the overrun state first, and then switched from the overrun state to the engaged state automatically as the engine 100 starts and speeds up, so that the torque from the engine 100 and/or the first motor 200 is added to the torque from the second motor 300 to propel the vehicle together.

4. Charging Mode

When the battery 600 is in short of electricity storage, the engine 100 can be used to drive the first motor 200 to generate electricity power and charge the battery. In that mode, the tri-state overrunning clutch 400 is preferably in the disengaged state.

5. Braking Energy Feedback Mode

During the vehicle braking process, the mechanical energy of the vehicle is converted into electric energy through the second motor 300 and/or through the first motor 200 via the tri-state overrunning clutch 400, and then stored into the battery. In that mode, the tri-state overrunning clutch 400 is preferably in the disengaged state. Since a tri-state overrunning clutch 400 is used between the first motor 200 and the second motor 300, no interference will occur between the first motor 200 and the second motor 300, and control will be easier, so that the vehicle can be switched among different driving modes conveniently.

Figure 16:
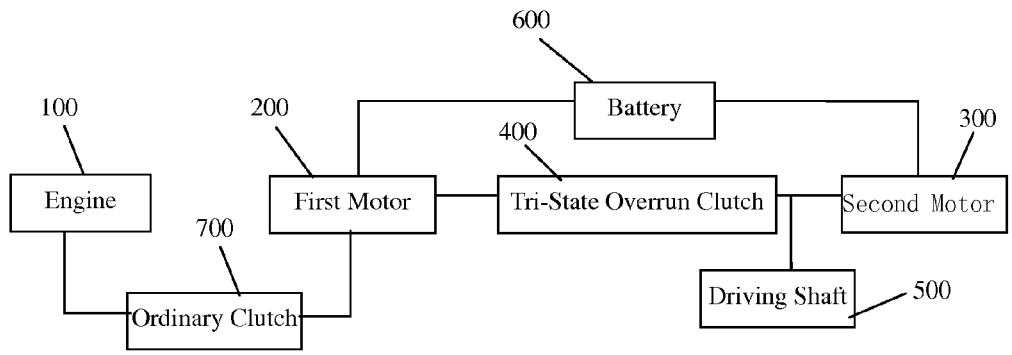
FIG. 16 is a schematic diagram of another embodiment of the hybrid power driving system shown in FIG. 14.

As shown in FIG. 16, as an embodiment, an ordinary clutch 700 (e.g., electromagnetic clutch) can be arranged between the engine 100 and the first motor 200.

In this embodiment, since an ordinary clutch 700 is arranged between the engine 100 and the first motor 200, the vehicle may have much more driving modes. For example, when the first motor 200 and the second motor 300 propel the vehicle together via the tri-state overrunning clutch 400, the ordinary clutch 700 can be disengaged so as to prevent the first motor 200 from pulling the engine 100; or, when the vehicle slows down or runs down a slope, the ordinary clutch 700 can be controlled in disengaged state, so that the first motor 200 can be used to recover mechanical energy of the vehicle to generate electric power and avoid pulling back the engine.

Figure 17:
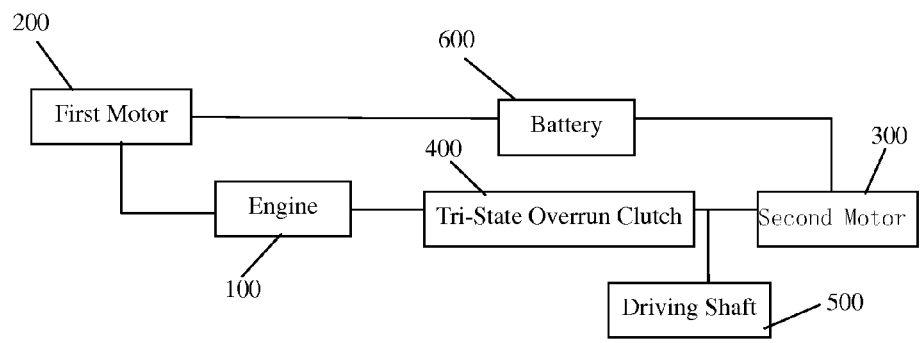
FIG. 17 is a schematic diagram of another embodiment of the hybrid power driving system shown in FIG. 14.

As shown in FIG. 17, as an embodiment, the first motor 200 can be provided only as a startup motor for the engine 100; in that case, the first motor 200 can be designed with a lower power capacity. When the vehicle is driven by the second motor 300, only the engine 100 provides assistance torque. Compared to the structure shown in FIG. 15, an assistant torque unit is omitted; while compared to the structure shown in FIG. 16, an ordinary clutch is omitted; therefore, the structure is simpler and easier to arrange.

Figure 18:
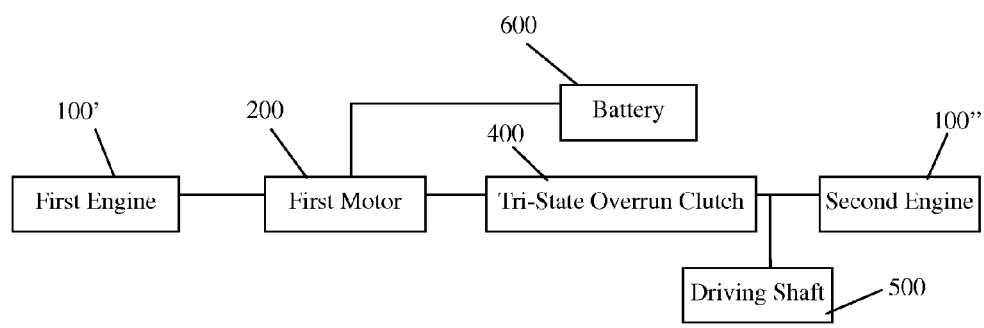
FIG. 18 is a schematic diagram of another embodiment of the hybrid power driving system shown in FIG. 14.

As shown in FIG. 18, the second motor 300 shown in FIG. 15 can be replaced with a second engine 100". In this embodiment, when the second engine 100" propels the vehicle, the first engine 100 and/or the first motor 200 can serve as assistant torque units. An advantage of such a structure is that the driving performance is improved significantly.

Driving Method for the Hybrid Power Driving System

As shown in FIG. 15, as a preferred embodiment of the present invention, the driving system can comprise an engine 100, a first motor 200 connected to the engine 100, a second motor 300, a driving shaft 500 connected to the second motor 300, a battery 600 electrically connected to the first motor 200 and the second motor 300, and a tri-state overrunning clutch 400 designed to connect the first motor 200 and the second motor 300, which may be in an overrun state, an engaged state, or a disengaged state.

As described above, the tri-state overrunning clutch 400 can comprise: an outer race 1 connected to the first motor 200; an inner race 2 connected to the second motor 300; a plurality of wedges 3 disposed between the outer race 1 and the inner race 2, each wedge 3 has a first end face 31 and a second end face 32 that are opposite to each other and contact with the corresponding working faces of the outer race 1 and inner race 2; and a retainer 4 arranged between the outer race 1 and the inner race 2 for retaining the wedges 3. The wedges 3 can rotate between the outer race 1 and the inner race 2, so as to move the second end face 31 away from the corresponding working face and thereby set the tri-state overrunning clutch 400 into the disengaged state.

Hereunder the driving method provided in the present invention will be detailed, with reference to the preferred driving system. It is noted that the driving method provided in the present invention is also applicable to a variety of other driving systems with the tri-state overrunning clutch.

The driving method comprises: controlling the tri-state overrunning clutch 400 in the overrun state, the engaged state, or the disengaged state according to the torque requirement of the driving shaft 500 and the charge value of the battery 600, when the second motor 300 outputs torque to the driving shaft 500.

When the tri-state overrunning clutch 400 is in the disengaged state, if the charge value of the battery 600 is lower than the preset value (e.g., 40% of the full charge), the engine 100 is started up to drive the first motor 200 to generate electrical power. In that case, since the tri-state overrunning clutch 400 is in the disengaged state, the engine 100 and the second motor 300 can work separately without any interference to each other; in addition, abrasion of the tri-state overrunning clutch can be avoided because the tri-state overrunning clutch is not in the overrun state.

The battery 600 can be provided with an onboard charging device. When the charge value of the battery 600 is lower than the preset value, the onboard charging device can be utilized as far as possible to charge the battery, and thereby reduce the use of engine 100 as much as possible. For example, when the vehicle is stopped, the battery 600 can be charged with city power supply or in a charging station.

When the tri-state overrunning clutch 400 is in the disengaged state, if the torque requirement of the driving shaft 500 is higher than the maximum torque available from the second motor 300, the engine 100 can be started to provide torque assistance to the system. In that case, the tri-state overrunning clutch 400 can be switched from the disengaged state to the overrun state first (i.e., the second end face 31 of the wedge is returned back to contact with the corresponding working face again), and then the engine 100 can be started and the tri-state overrunning clutch 400 can be switched from the overrun state to the engaged state automatically as the engine 100 speeds up. After that, if the torque requirement of the driving shaft 500 reduces to below the maximum torque available from the second motor 300, the speed of the engine 100 can be reduced, and the tri-state overrunning clutch 400 will be switched from the engaged state to the overrun state automatically, and then switched to the disengaged state if required.

Therefore, in that driving method, as long as the torque available from the second motor 300 can meet the torque requirement for travelling, the second motor 300 will be used solely to drive the vehicle; as the consequence, the use of the engine 100 can be minimized, and fuel consumption and gas discharge can be reduced effectively and environmental pollution can be reduced.

When the engine 100 slows down and the tri-state overrunning clutch 400 enters into the disengaged state, the engine 100 can be kept to run further for a preset duration, such as 5-15 seconds, preferably 10 seconds. In this period, the engine can be in idle, or drive the first motor to generate electrical power if required. In that implementation, increased fuel consumption and gas discharge caused by frequent start/stop of the engine can be prevented. In addition, since the torque assisting process for the vehicle is generally short, if the engine is kept running for the preset duration after the torque assisting process is ended, the engine can respond quickly to provide torque assistance for the vehicle again when another torque assistance is called.

The second motor 300 can be designed or sized to propel the vehicle at cruising speeds separately, so as to reduce the use of the engine as far as possible.

The first motor 200 can be designed to have higher efficiency than the second motor 300 at higher speeds; while the second motor 300 can be designed to have higher efficiency than the first motor 200 at lower speeds. In addition, the second motor 300 can be designed to have higher power than the first motor 200.

When the engine 100 starts, preferably three power generation ranges are set for the engine 100 and the engine 100 is controlled to work in any of the three power generation ranges according to the actual condition, so as to ensure the engine 100 has optimal working efficiency in different conditions. The three power generation ranges includes low power generation range, middle power generation range, and high power generation range. When the temperature of coolant in the engine 100 is higher than 100° C., the engine 100 will be controlled to work in the low power generation range; when the torque requirement is higher than 80% of the maximum power output from the second motor 300 for 0.5~1 min., the engine 100 can be controlled to work in the high power generation range; in other conditions, the engine 100 can be controlled to work in the middle power generation range.

For engines with different power capacities, the low power generation range, middle power generation range, and high power generation range are different; here, the low power generation range, middle power generation range, and high power generation range may be roughly set to be 8-12 kw/1800-2200 rpm, 18-22 kw/1800-3200 rpm, and 40-46 kw/4200-4800 rpm, wherein, "kw" represents the power and "rpm" represents the rotation speed. Wherein, the temperature of coolant in the engine 100 can be read from the engine controller.

While the driving method provided in the present invention is described above in detail with reference to a typical hybrid power driving system, it is obvious that the driving method is not limited to the hybrid power driving system. The driving method is also applicable to hybrid power driving systems in other forms, such as the hybrid power driving system shown in FIG. 16.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

The invention claimed is:

1. A hybrid power driving system, comprising:
   a first subsystem configured to receive power and transmit power;
   a second subsystem configured to receive power and transmit power;
   a driving shaft configured to receive power from the first subsystem and/or the second subsystem and provide output power to the first subsystem and/or the second subsystem;
   a tri-state overrunning clutch configured to operatively couple the first subsystem and the second subsystem, wherein the overrunning clutch is configured to be in an overrun state, an engaged state, or a disengaged state; and
   the tri-state overrunning clutch having an outer race with a plurality of arcuate recesses, an inner race, and a plurality of wedges disposed between the outer race and the inner race, the wedges configured to pivot between the arcuate recesses of the outer race and the inner race to provide the overrun state, the engaged state, and the disengaged state.

2. The hybrid power driving system according to claim 1, wherein the tri-state overrunning clutch comprises:
   the outer race connected to the first subsystem;
   the inner race connected to the second subsystem;
   the plurality of wedges disposed between the outer race and the inner race, each wedge having a first end face and a second end face that are opposite each other;
   the first and second end faces configured to contact respective working faces of the outer race and the inner race; and
   a retainer arranged between the outer race and the inner race and configured to retain the wedges, wherein the wedges are configured to pivot between the outer race and the inner race so that the second end face moves away from the corresponding working face to permit the tri-state overrunning clutch to enter a disengaged state.

3. A hybrid power driving system, comprising:
   an engine;
   a first motor operatively coupled to the engine;
   a second motor;
   a driving shaft connected to the second motor;
   a battery electrically connected to the first motor and the second motor; and
   a tri-state overrunning clutch configured to operatively couple the first motor and the second motor, wherein the tri-state overrunning clutch is configured to be in an overrun state, an engaged state or a disengaged state; and
   the tri-state overrunning clutch having an outer race with a plurality of arcuate recesses, an inner race, and a plurality of wedges disposed between the outer race and the inner race, the wedges configured to pivot between the arcuate recesses of the outer race and the inner race to provide the overrun state, the engaged state, and the disengaged state.

4. The hybrid power driving system according to claim 3, wherein the tri-state overrunning clutch comprises:
   the outer race connected to the first motor;
   the inner race connected to the second motor;
   the plurality of wedges disposed between the outer race and the inner race, each wedge having a first end face and a second end face that are opposite to each other;
   the first and second end faces configured to contact respective working faces of the outer race and the inner race; and
   a retainer arranged between the outer race and the inner race and configured to retain the wedges, wherein the wedges are configured to pivot between the outer race and the inner race so that the second end face moves away from the corresponding working face to permit the tri-state overrunning clutch to enter the disengaged state.

5. The hybrid power driving system according to claim 3, further comprising an onboard charging device configured to charge the battery.

6. The hybrid power driving system according to claim 3, wherein the second motor has sufficient power to propel the vehicle at cruising speeds independent of the first motor.

7. The hybrid power driving system according to claim 3, wherein:
   the first motor is configured to have a higher efficiency than the second motor at higher speeds; and
   the second motor is configured to have a higher efficiency than the first motor at lower speeds.

8. The hybrid power driving system according to claim 3, wherein the second motor has a higher power output than the first motor.

9. A driving method for hybrid power driving system, wherein
   the driving system comprises:
   an engine;
   a first motor operatively coupled to the engine;
   a second motor;

a driving shaft connected to the second motor;
a battery electrically connected to the first motor and the second motor; and
a tri-state overrunning clutch configured to operatively couple the first motor and the second motor, and configured to be in an overrun state, an engaged state, or a disengaged state, wherein the tri-state overrunning clutch includes an outer race having a plurality of arcuate recesses, an inner race, and a plurality of wedges disposed between the outer race and the inner race, the wedges configured to pivot between the arcuate recesses of the outer race and the inner race to provide the overrun state, the engaged state, and the disengaged state;

the driving method comprises:
controlling the tri-state overrunning clutch in the overrun state, the engaged state, or the disengaged state according to a torque requirement of the driving shaft and a charge level of the battery, when the second motor outputs torque to the driving shaft.

10. The driving method according to claim 9, wherein the tri-state overrunning clutch comprises:
the outer race connected to the first motor;
the inner race connected to the second motor;
the plurality of wedges disposed between the outer race and the inner race, each wedge having a first end face and a second end face that are opposite to each other;
the first and second end faces configured to contact respective working faces of the outer race and the inner race; and
a retainer arranged between the outer race and the inner race configured to retain the wedges, wherein the wedges are configured to pivot between the outer race and the inner race so that the second end face moves away from the corresponding working face to permit the tri-state overrunning clutch to enter the disengaged state.

11. The driving method according to claim 9, wherein when the tri-state overrunning clutch is in the disengaged state, if a charge level of the battery is lower than a predetermined value, the engine is started to drive the first motor, which generates electrical power.

12. The driving method according to claim 9, wherein:
when the tri-state overrunning clutch is in the disengaged state, if the torque requirement of the driving shaft is higher than a maximum torque available from the second motor, then:
the tri-state overrunning clutch is switched from the disengaged state to the overrun state;
the engine is started; and
the tri-state overrunning clutch is switched from the overrun state to the engaged state automatically as the engine speed increases;
if the torque requirement of the driving shaft decreases below the maximum torque available from the second motor, then:
the speed of the engine is reduced;
the tri-state overrunning clutch is switched from the engaged state to the overrun state automatically; and
the tri-state overrunning clutch is then switched to the disengaged state.

13. The driving method according to claim 12, wherein after the speed of the engine decreases and the tri-state overrunning clutch enters the disengaged state, the engine is controlled to run in an idle state or drive the first motor to generate electrical power for a predetermined amount of time.

14. The driving method according to claim 13, wherein the predetermined amount of time is between 5 seconds and 15 seconds.

15. The driving method according to claim 9, wherein the battery is charged by an onboard charging device.

16. The driving method according to claim 9, wherein the second motor has sufficient power to propel the vehicle at cruising speeds independent of the first motor.

17. The driving method according to claim 9, wherein:
the first motor is configured to have a higher efficiency than the second motor at higher speeds; and
the second motor is configured to have a higher efficiency than the first motor at lower speeds.

18. The driving method according to claim 9, wherein the second motor has a higher power output than the first motor.

19. The driving method according to claim 9, wherein:
the engine is configured to have three power generation ranges, including a low power generation range, a middle power generation range, and a high power generation range;
when a temperature of a coolant in the engine is greater than 100° C., the engine is controlled to operate in the low power generation range;
when the torque requirement is higher than 80% of a maximum power output of the second motor for a time duration of between 0.5 minutes to 1 minute, the engine is controlled to operate in the high power generation range;
otherwise, the engine is controlled to operate in the middle power generation range.

20. The driving method according to claim 9, wherein the low power generation range is between 8 kw and 12 kw at 1800-2200 rpm, the middle power generation range is between 18 kw and 22 kw at 1800-3200 rpm, and the high power generation range is between 40 kw and 46 kw at 4200-4800 rpm.

21. A hybrid power driving system, comprising:
an engine;
a first motor operatively coupled to the engine;
a second motor;
a driving shaft connected to the second motor;
a battery electrically connected to the first motor and the second motor; and
a tri-state overrunning clutch configured to operatively couple the first motor and the second motor, wherein the tri-state overrunning clutch is configured to be in an overrun state, an engaged state or a disengaged state, and wherein the second motor has a higher power output than the first motor.

22. A driving method for hybrid power driving system, wherein
the driving system comprises:
an engine;
a first motor operatively coupled to the engine;
a second motor;
a driving shaft connected to the second motor;
a battery electrically connected to the first motor and the second motor
an onboard charging device configured to charge the battery; and
a tri-state overrunning clutch configured to operatively couple the first motor and the second motor, and configured to be in an overrun state, an engaged state, or a disengaged state;
the driving method comprises controlling the tri-state overrunning clutch in the overrun state, the engaged state, or the disengaged state according to a torque requirement of the driving shaft and a charge level of the battery, when the second motor outputs torque to the driving shaft.

* * * * *